Figure 1:
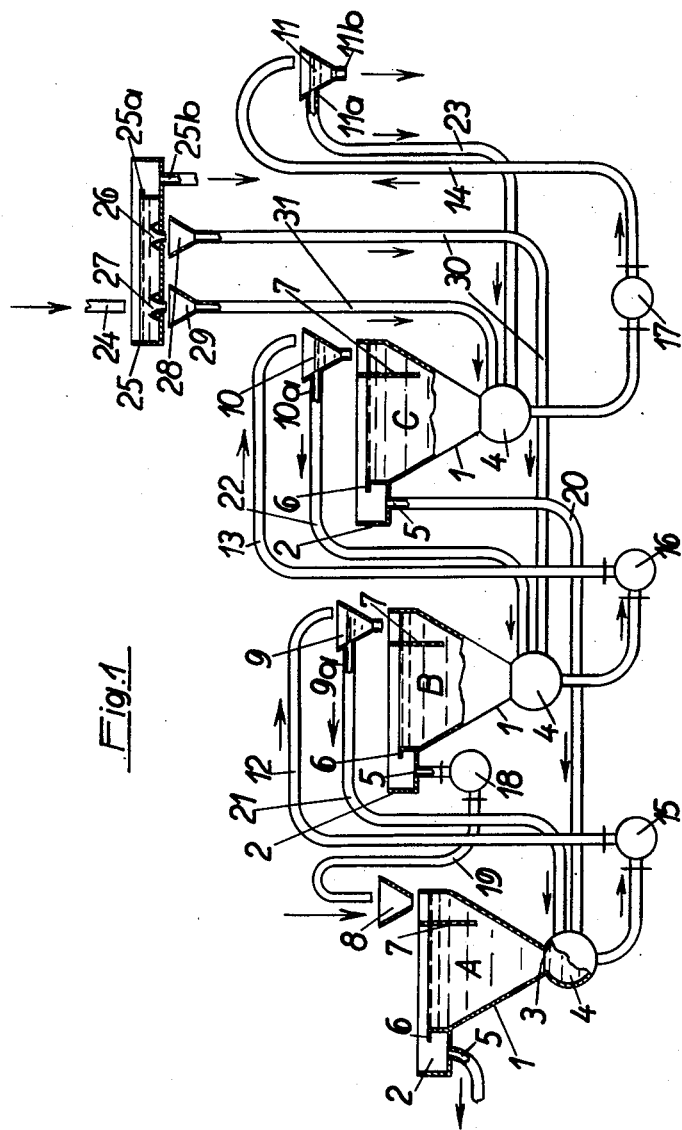

April 30, 1957 T. EDER 2,790,551
CONTINUOUS HORIZONTAL SEDIMENTATION PROCESS
AND APPARATUS FOR CARRYING OUT THE SAME
Filed Jan. 27, 1953 3 Sheets-Sheet 1

INVENTOR
THEODOR EDER
By Bates, Teare, y McBean
ATTORNEYS

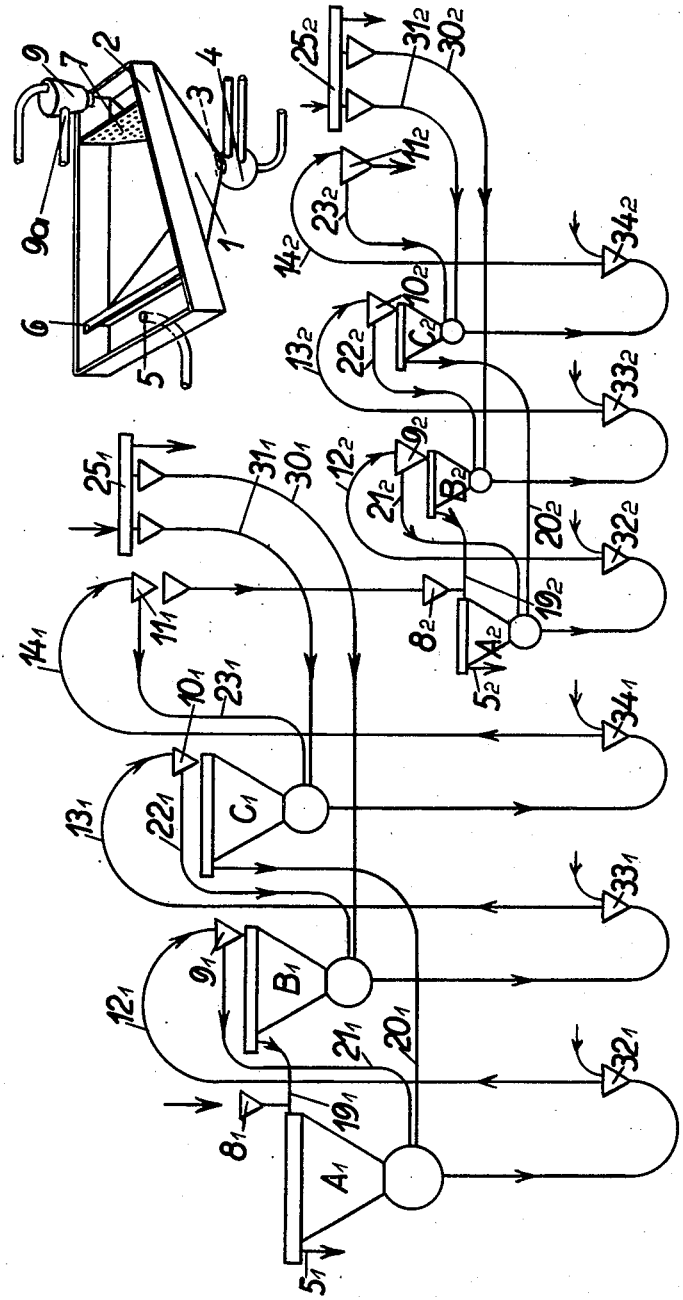

United States Patent Office 2,790,551
Patented Apr. 30, 1957

2,790,551

CONTINUOUS HORIZONTAL SEDIMENTATION PROCESS AND APPARATUS FOR CARRYING OUT THE SAME

Theodor Eder, Vienna, Austria

Application January 27, 1953, Serial No. 333,483

Claims priority, application Austria February 19, 1952

11 Claims. (Cl. 209—155)

The invention relates to a continuous, a multiple-stage, horizontal sedimentation process, in which raw feed is separated by the final velocity of fall of the particles in liquid into two or more fractions with high selectivity, and which aims at achieving a selectivity approaching that of the most accurate vertical sedimentation methods.

Hereinafter the particle size variation K 20/80 is used as a measure of the selectivity.

For perfect selectivity this value equals one, it grows as the selectivity declines.

While particle size variations K 20/80 as small as 1.4 can be achieved with certain vertical separation processes, e. g., that disclosed in the Austrian Patent No. 165,360, these values remain above 3 in the presently known single- or multiple-stage horizontal sedimentation processes.

On the other hand, vertical sedimentation generally fails in the case of very small critical particle sizes owing to fluid-dynamical difficulties.

It is a special object of the invention to open up the region of critical velocities of fall $V_{50}$ below 3 cm./sec. for selective sedimentation methods having a particle size distribution K 20/80 below 2.

(Compare the papers "Zur einheitlichen Kennzeichnung der Trennschärfe," Montanzeitung, Vienna, September 1951, pp. 163–165, and "Choix d'un coefficient unique pour caractériser la précision de séparation, und proposition de normalisation internationale, Revue de l'industrie minérale, St. Etienne, December 1951, pp. 479–482).

It is known that liquids may be separated from solids by multiple-stage horizontal sedimentation, e. g., continuous decantation with the aid of several concentrators, usually in a countercurrent to save water. In these processes the sediment is raised, e. g., by means of pulp pumps, from an opening in the bottom of one concentrator to the inlet of the next one whereas the fine overflow of each concentrator is fed to the inlet of the preceding one.

While known processes of this and similar types enable the separation, e. g., of pure liquids (particle diameter=0) from certain particle sizes (e. g., from all particle sizes above 0.02 mm.), the selectivity of such processes is insufficient for a perfect grain separation, which requires a separation of the original liquid from all grain sizes below 0.02 mm., as well as from the coarse fraction, as in the foregoing example.

The invention provides a horizontal sedimentation process using at least two stages in series, each of which yields fines and sediment, and wherein the liquid-suspended sediment of at least one stage is raised and fed in a constant stream to the inlet of the next following stage, while the overflowing matter is allowed to flow back to the sediment delivered from the preceding stage. Moreover, the sediment delivered from the original stage is supplemented by the addition thereto of pure washing liquid or washing liquid containing the fines of the second next stage, before it enters the feeding means (pump, compressed-air pulsometer, or the like). The rate of flow of this washing liquid and of the suspension of sediment fed from one stage, e. g., the first one, to the inlet of the next following stage, is adjusted to prevent, at the sediment outlet of at least one stage, either an upcurrent of liquid exceeding 20% or a downcurrent of liquid exceeding 15% of the total sedimentation flow rate. "Total sedimentation flow rate" is the rate in litres per second of matter admitted to the respective stage.

Said flow rates are preferably adjusted to provide a substantially zero rate of flow at the sediment outlet of at least one stage.

In a four-stage horizontal sedimentation process, using countercurrent, it has been found, for example, that when the conditions according to the invention are maintained accurately, a particle size variation K 20/80=1.6 can be achieved, and that this value rises to 2 in the case of an upcurrent of 20% or a downcurrent of 15% of the total sedimentation current, and increases rapidly in the case of a further increase of the current at the stage outlets.

The invention further provides for a selective separation into three or more fractions by adjusting the sedimentation first to the smallest of the critical particle sizes (or critical velocities of fall) desired according to the foregoing conditions, by a very small specific sedimentation flow rate in the several stages. The specific sedimentation flow rate (in litres per second and per square decimetre) is the sedimentation flow rate related to the unit sedimentation area. The sedimentation area is the horizontal sectional area of the essential range of sedimentation flow. In most cases of horizontal sedimentation, the sedimentation area can be considered equal the liquid surface area.

The fines of the first separation are a finished product, whereas the coarses are subjected to another sedimentation step according to the aforesaid conditions, the specific sedimentation flow rate being adjusted for the next following critical particle size or critical velocity of flow.

The invention also includes a plant for carrying out the process according to the invention.

The invention will be explained with reference to the accompanying drawings, which illustrate several examples of horizontal sedimentation plants.

Figure 2:
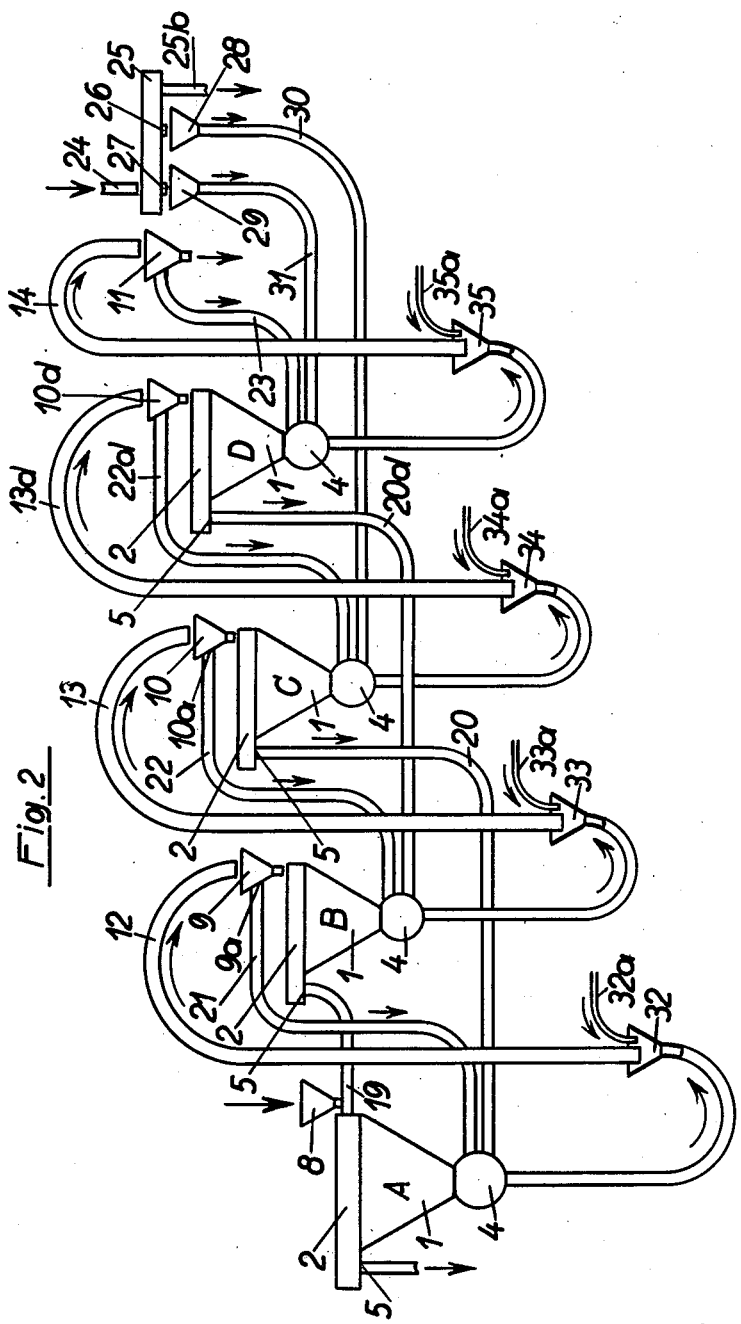

Fig. 1 is an elevation, partly in section, showing a three-stage plant for dry raw feed;

Fig. 2 a similar view of a four-stage plant for raw feed introduced with liquid;

Fig. 3 is a schematical view of a combined arrangement of two three-stage plants for subdividing liquid raw feed into three sedimentation classes and Fig. 4 is a perspective view of an example of a sedimentation body.

The three-stage horizontal sedimentation plant shown in Fig. 1 comprises three sedimentation bodies A, B, C of equal size, each of which may consist of an open-topped container 1, illustrated in Fig. 4, as having an inverted pyramid-like base, merging at its upper end in a short prismatic extension 2 of trapezoidal cross section, one end of which protrudes outwardly beyond the base. The bottom of the pyramid communicates through a restricted outlet 3 with a spherical enlargement or globe 4. The wider or outwardly protruding portion of the extension 2 is provided with a bottom wall having an outlet 5 and is separated from the main portion of the container 1 by an overflow or partition 6. Opposite to the overflow 6 the narrow part of the extension 2 is provided with a sieve plate 7, which stops short of the bottom of the pyramid-shaped container 1. Above the container portion extending between the sieve plate 7 and the right hand end of the extension 2, the first sedimentation body A has a feed funnel 8 for the dry raw feed, and the sedimentation bodies B and C have inlet funnels 9 and 10, respectively, for the sediment raised from the respective preceding sedimentation body. The funnels 9 and 10 each constitute a metering device having an overflow and an outlet nozzle of definite orifice area. Another metering device 11 of the same type is arranged behind the sedimentation body C. Each of the pipe lines 12, 13, 14, leading from the bottom of the spherical enlargements or globes 4 of the sedimentation bodies A, B, C to the metering devices 9, 10, 11, respectively, include respective pumps 15, 16 or 17, which force the sediment from the respective sedimentation bodies A, B and C to the respective metering device 9, 10 or 11.

Another pump 18 is incorporated in a pipeline 19, which is connected to the outlet 5 of the sedimentation body B and terminates at a point above the feed funnel 8 of the sedimentation body A. The outlet 5 of the sedimentation body A delivers the finished fines, whereas the outlet 5 of the sedimentation body C is connected by a pipeline 20 to the globe 4 of the sedimentation body A. The overflows 9a, 10a, 11a of the metering devices 9, 10 and 11 are connected to the globe 4 of the respective preceding sedimentation bodies by pipelines 21, 22 or 23, respectively.

An overhead tank 25 is provided which is continuously fed with liquid from a suitable source through a line 24 and meters the total liquid supply. The overhead tank 25 is equipped with a continuous overflow 25a and an outlet 25b. The bottom of the overhead tank, in which the level is maintained constant by the overflow 25a, has two outlets provided with respective replaceable outlet nozzles 26, 27 of definite orifice area, from each of which pure washing liquid flows in a free jet through an air gap into respective funnel-shaped equalizing vessels 28 or 29 which are connected by pipelines 30 and 31 to the globes of the sedimentation bodies B or C, respectively.

When the plant has been filled with through-flowing washing liquid from the overhead tank 25, the pumps 15 to 18 are started and the raw feed to be treated is fed in a dry condition into the feed funnel 8, where it is mixed with the liquid raised by means of pump 18 from overflow 6 and outlet 5 of sedimentation body B through line 19, and is then passed into the sedimentation body A. The fines are immediately entrained by the sedimentation current and pass through sieve plates 7 and come out into the open past overflow 6 and through outlet 5. The coarses still having fines admixed therewith subside in the pyramid-shaped container 1 and pass through the bottom opening 3 thereof into the globe 4, from which the sediment is conveyed by the pump 15 through line 12 into the inlet 9, and due to nozzles and overflow enters the sedimentation body B, at an accurately metered rate where it is separated again. The surplus of the raised sediment flows back into the globe 4 of the sedimentation body A past the overflow 9a and through line 21. The globe 4 further receives liquid from the overflow 6 and outlet 5 of the sedimentation body C through the pipeline 20. The sediment of the sedimentation body B is raised from its globe 4 by the pump 16 through pipeline 13 into the inlet 10, from which sediment enters the sedimentation body C at a metered rate where another separation is effected, while the surplus of sediment supplied to inlet 10 flows back into the globe 4 of the preceding sedimentation body B past overflow 10a and through line 22. As stated above, the fines of sedimentation body C enter the globe 4 of sedimentation body A through line 20, while the sediment is conveyed by pump 17 through pipeline 14 into the metering device 11, from which the sediment is discharged as final coarse matter at a rate determined by the orifice area of the outlet nozzle 11b thereof. The surplus of sediment flows back past the overflow 11a and through the pipeline 23 into the globe 4 of the last sedimentation body C.

The globes 4 of sedimentation bodies B and C are supplied through pipes 30 and 31, respectively, with pure washing liquid from overhead tank 25, at a predetermined rate. Hence, after the separation in the preceding stages has been effected, the fines of the feed introduced at 8 will be discharged through the outlet 5 of the first sedimentation body A, whereas the coarses will be discharged at the nozzle 11b of the metering device 11 arranged behind the sedimentation body C.

The overflowing part of the sediment which has been raised into the metering devices 9, 10 and 11, returns to the globe 4 of the respective preceding sedimentation body A, B, or C, respectively, i. e., in front of the pumps 15, 16, 17. The return flow of the washing water containing the fines of sedimentation body C into the globe 4 of sedimentation body A, and the supply of pure washing water at a metered rate from the equalizing tanks 28, 29 into the globe 4 of each at the sedimentation bodies B and C, contributes essentially to the achievement of high selectivity. The agglomerated sediment subsided through the restricted opening 3 in the bottom of the containers 1 of the sedimentation bodies is brought into a uniform suspension by the twofold liquid supply described and by the swirling in the pumps. The swirling motion produced in the globes 4 by the two liquid supplies cannot be transmitted to the interior of the sedimentation bodies owing to the considerable reduction in the cross section of the communicating orifice which connects the globe 5 with its container 1. The flow rates of the washing liquid, whether pure or containing the fines of the second next sedimentation body, into the globes 4, on the one hand, and of the sediment fed from one sedimentation body to the next following sedimentation body through its inlet metering device, on the other hand, can be adjusted to provide a flow through the bottom opening 3 of the respective sedimentation body which in the optimum case is practically zero. This is essential for high selectivity.

The horizontal sedimentation plant shown in Fig. 2, for liquid raw feed, comprises four series-connected sedimentation bodies A, B, C and D, the first of which A, has a larger sedimentation area than each of the other sedimentation bodies B, C, D, to allow for the quantity of liquid in which the particles are suspended.

In Fig. 2 all parts corresponding to those of Fig. 1 are provided with the same reference characters. The metering device added to the fourth sedimentation body D and the pipelines leading from said device to the preceding sedimentation bodies have been given the designations of the corresponding parts associated with the sedimentation body C in Fig. 1, though with the index $d$, such as metering device $10d$. The pumps shown in Fig. 1 have been replaced by compressed-air pulsometers 32, 33, 34 and 35, for raising the sediments from sedimentation bodies A, B, C and D. The pulsometers are connected by pipes $32a$, $33a$, $34a$ and $35a$ to a common air compressor, which is not shown. In view of the entrained air the pipelines 12, 13, $13d$, and 14 feeding the sediment to the metering devices 9, $10d$ and 11 must be of enlarged cross section. The references and arrows show that in other respects the connections are the same as described with reference to Fig. 1, and so is the function.

Fig. 3 shows the combination of two three-stage plants according to the schematic illustration of Fig. 2, for the selective separation of the raw feed supplied at $8_1$ in liquid suspension. The finished fines are discharged at the outlet $5_1$ of the first sedimentation body $A_1$ of the first series arrangement $A_1$, $B_1$ and $C_1$, and the coarses discharged from the metering device $11_1$, of said plant are fed into the feed funnel $8_2$ of the first sedimentation body $A_2$ of the second plant $A_2$, $B_2$, $C_2$, from the outlet $5_2$ of which the finished medium-size matter is discharged. The finished coarses are obtained from the metering device $11_2$ of the second series arrangement.

Example 1

A quartz sand was processed having mainly rounded grains and a sieve analysis as given in column A below.

After a four-stage horizontal sedimentation treatment in a countercurrent, under the conditions of the present invention, coarses as specified in column B and fines as specified in column C were obtained:

| Sieve Opening Class | A Raw Feed | B Coarses | C Fines |
|---|---|---|---|
| More than 0.5 mm_____percent__ | 7.1 | 8.8 | 0 |
| 0.5-0.4 mm_____do___ | 20.5 | 25.5 | 0 |
| 0.4-0.3 mm_____do___ | 27.2 | 33.9 | 0 |
| 0.3-0.25 mm_____do___ | 10.3 | 12.6 | 0.5 |
| 0.25-0.2 mm_____do___ | 7.1 | 8.4 | 1.5 |
| 0.2-0.15 mm_____do___ | 6.3 | 6.4 | 5.7 |
| 0.15-0.12 mm_____do___ | 4.2 | 3.0 | 9.3 |
| 0.12-0.09 mm_____od___ | 4.8 | 1.2 | 19.6 |
| 0.09-0.06 mm_____do___ | 5.3 | 0.2 | 26.3 |
| 0.06-0.04 mm_____do___ | 2.2 | 0 | 11.3 |
| Less than 0.04 mm_____do___ | 5.0 | 0 | 25.8 |
| Yields_____parts__ | 100 | 80.6 | 19.4 |

Hence 100 grams of that raw sand has been classified as follows:

| Sieve Opening Class (mm.) | Average Grain Diameter of Sieve Opening Class (mm.) | Raw Feed (grams) | Coarses (grams) | Fines (grams) | Percentage of Fines in this Sieve Opening Class, percent |
|---|---|---|---|---|---|
| More than 0.5___ | ? | 7.1 | 7.1 | 0 | 0 |
| 0.5-0.4_____ | 0.45 | 20.5 | 20.5 | 0 | 0 |
| 0.4-0.3_____ | 0.35 | 27.2 | 27.2 | 0 | 0 |
| 0.3-0.25_____ | 0.275 | 10.3 | 10.2 | 0.1 | 1 |
| 0.25-0.2_____ | 0.225 | 7.1 | 6.8 | 0.3 | 4 |
| 0.2-0.15_____ | 0.175 | 6.3 | 5.2 | 1.1 | 18 |
| 0.15-0.12_____ | 0.135 | 4.2 | 2.4 | 1.8 | 43 |
| 0.12-0.09_____ | 0.105 | 4.8 | 1.0 | 3.8 | 79 |
| 0.09-0.06_____ | 0.075 | 5.3 | 0.2 | 5.1 | 96 |
| 0.06-0.04_____ | 0.05 | 2.2 | 0 | 2.2 | 100 |
| Less than 0.04___ | ? | 5.0 | 0 | 5.0 | 100 |
|  |  | 100 | 80.6 | 19.4 |  |

The relation between the second and sixth columns in the above tabulation is significant for an evaluation of the selectivity.

By interpolation, the following results are obtained:

| From the 6th Column | From the 2nd Column, mm. |
|---|---|
| 20% (critical grain size $K_{20}$) | 0.17 |
| 50% (critical grain size $K_{50}$) | 0.13 |
| 80% (critical grain size $K_{80}$) | 0.105 |

The grain size variation K 20/80 = 0.17 mm.: 0.105 mm. = 1.6.

Example 2

A quartz sand was processed having mainly rounded grains and the same sieve analysis as in Example 1.

After a four-stage horizontal sedimentation treatment in a countercurrent, according to the foregoing teachings of the invention, with an adjustment of a specific sedimentation flow rate of 1.5 cm./sec. (0.15 litre per second per square decimetre of sedimentation area) a critical grain size $K_{50}$ of 0.1 mm. was reached. The grain size variation K20/80 of this separation was 1.5.

The coarses from the above separation were resedimented at a specific sedimentation flow rate of 3 cm./sec. to obtain a critical grain size $K_{50}$ of 0.15 mm. The grain size variation K20/80 for this second separation was 1.6.

Example 3

A mixture of scheelite (specific gravity 6) and a silicate of a specific gravity of 2.6 was processed.

100 grams of this raw material contained

|  | Scheelite, grams | Silicate, grams |
|---|---|---|
| More than 0.2 mm | 3 | 0 |
| 0.2-0.1 mm | 28 | 15 |
| 0.1-0.06 mm | 10 | 30 |
| Less than 0.06 mm | 4 | 10 |
|  | 45 | 55 |

After a four-stage horizontal sedimentation treatment in a countercurrent, according to the conditions of this invention and at a specific sedimentation flow rate of 4 cm./sec., two fractions of the following composition and sieve analysis were obtained

| Raw Feed: 100 grams | | | | |
|---|---|---|---|---|
| | Fines, 62 grams | | Coarses, 38 grams | |
| | Scheelite (Grams) | Silicate (Grams) | Scheelite (Grams) | Silicate (Grams) |
| More than 0.2 mm | 0 | 0 | 3 | 0 |
| 0.1-0.2 mm | 2 | 13 | 26 | 2 |
| 0.06-0.1 mm | 4 | 30 | 6 | 0 |
| Less than 0.06 mm | 3 | 10 | 1 | 0 |
|  | 9 | 53 | 36 | 2 |

Whereas the raw feed had a scheelite content of 45%, the latter had been increased to 95% in the coarses. The waste (fines) contained 15% of scheelite. A total of 20% of the original scheelites had passed into the fines.

I claim:

1. In a continuous horizontal sedimentation process carried out in at least two sedimentation stages each of which yields fines and sediment, including admitting material to be separated together with a sedimentation liquid to one of said stages for sedimentation therein, discharging liquid-suspended sediment through a restricted outlet opening formed in said stage, adding and admixing a washing liquid to said liquid-suspended sediment discharged from said stage, raising the resulting mixture, feeding part only of said raised mixture to the next following stage, returning and mixing the remainder of said mixture with the unraised sediment discharged from the first named stage, and controlling the rate of feed of said mixture to said following stage relative to the rate of addition of washing liquid so as to keep any liquid transfer through said outlet opening of said first named stage below 20% of the rate of feed of liquid and material to the first named stage when liquid flows through said outlet opening into said first named stage and below 15% of the rate of feed of liquid and material to said first named stage when liquid flows through said outlet opening from said first named stage, all of said rates being considered on a volume basis.

2. The process set forth in claim 1, in which the added washing liquid is added to the sediment discharged from the first named stage.

3. The improvement set forth in claim 1, in which said raised liquid-suspended sediment is fed into the inlet of said next following stage at a feed rate equal to the feed admission rate of liquid and material to the preceding stage.

4. The improvement set forth in claim 1, in which said raised liquid-suspended sediment is fed into the inlet of said next following stage at a feed rate less than the rate of admission of liquid and material to said preceding stage.

5. The process set forth in claim 1, in which the rate of feed of said mixture to said second named stage is maintained substantially equal to the rate of flow at which said washing liquid is added to the liquid-suspended sediment discharged from the first named stage.

6. The process set forth in claim 1, in which pure washing liquid is added to the sediment.

7. The process set forth in claim 1, which includes using at least three sedimentation stages arranged in series, and in which the washing liquid added to the discharged sediment contains fines discharged from the second next stage.

8. A continuous horizontal sedimentation process for the selective separation of divided material into at least three sedimentation classes, said process being carried out in a series of sedimentation groups, each group comprising at least two sedimentation stages arranged in series, each stage yielding fines and sediment, said process including the steps of supplying feed material comprising sedimentation liquid and divided material to one stage of the first of said groups for sedimentation therein, discharging liquid-suspended sediment through a restricted outlet opening of each stage, feeding the sediment discharged by the last stage of each group excepting the last group as feed material to the first stage of the next following group, drawing off the fines of the first stage of each of said groups as finished product, maintaining in the stages of successive groups a feed rate per unit of sedimentation area which progressively increases from the first to the last of said groups, adding and admixing washing liquid to the liquid-suspended sediment discharged from at least one stage of each of said groups, raising the resulting mixture, feeding part only of said raised mixture to the next following stage of such group, returning the remainder of said raised mixture and mixing it with the unraised sediment discharged from the preceding stage, and controlling the rate of feed of said mixture to said next following stage and the rate at which said washing liquid is added to said discharged sediment to keep any liquid transfer through said outlet opening of the foregoing stage below 20% of the feed rate at which material is fed to the preceding stage when liquid flows through said outlet opening into said stage and below 15% of said last mentioned feed rate when liquid flows from said preceding stage through its outlet opening, all of said rates being considered on a volume basis.

9. In a horizontal sedimentation plant comprising a plurality of series-connected sedimentation bodies each formed with an inlet for admission of sedimentation liquid and material to be separated, an outlet for the fines, and a bottom outlet opening, means for admitting feed material to one of said bodes, the combination of an open-topped substantially spherical vessel connected to the bottom outlet by a restricted passageway, the spherical vessel of one of said sedimentation bodies having two conduits connected thereto, a supply of washing liquid, means to feed said washing liquid from said supply to said spherical vessel through one of said conduits at a predetermined rate of flow, a metering device arranged above and connected between said spherical vessel and the inlet of the next following sedimentation body, means for raising liquid-suspended sediment from said spherical vessel to said metering device, said metering device having an overflow connected to the other of said conduits, said metering device having an outlet metering nozzle connected to discharge into the inlet of said next following sedimentation body, said nozzle being restricted to feed said liquid suspended sediment at a rate of flow which when the liquid in said metering device is level with said overflow is so related to the rate at which washing liquid is fed to the spherical vessel of the preceding stage as to maintain liquid transfer through said bottom outlet of said preceding stage below 20% of the feed rate of material and liquid to said preceding stage when liquid flows through said bottom outlet into said stage and below 15% of the last named feed rate when liquid flows out of said preceding stage through its bottom outlet, all said rates being considered on a volume basis.

10. A sedimentation plant as set forth in claim 9, in which the upper part of said spherical vessel merges into said bottom outlet opening.

11. A sedimentation plant as set forth in claim 9, which comprises at least three sedimentation bodies connected in series and in which said washing liquid supply comprises the discharge from the outlet for the fines of the second sedimentation body following sedimentation body to which said spherical vessel being supplied thereby is connected.

References Cited in the file of this patent

UNITED STATES PATENTS

| 1,021,009 | Speer | Mar. 26, 1912 |
| 1,914,039 | Parkinson et al. | June 13, 1933 |
| 1,916,035 | Berguerand | June 27, 1933 |
| 1,957,182 | Schaus | May 1, 1934 |
| 2,136,281 | Dickinson | Nov. 8, 1938 |

FOREIGN PATENTS

| 465,154 | Germany | Sept. 7, 1928 |
| 757,461 | France | Dec. 27, 1933 |